Figure 1:
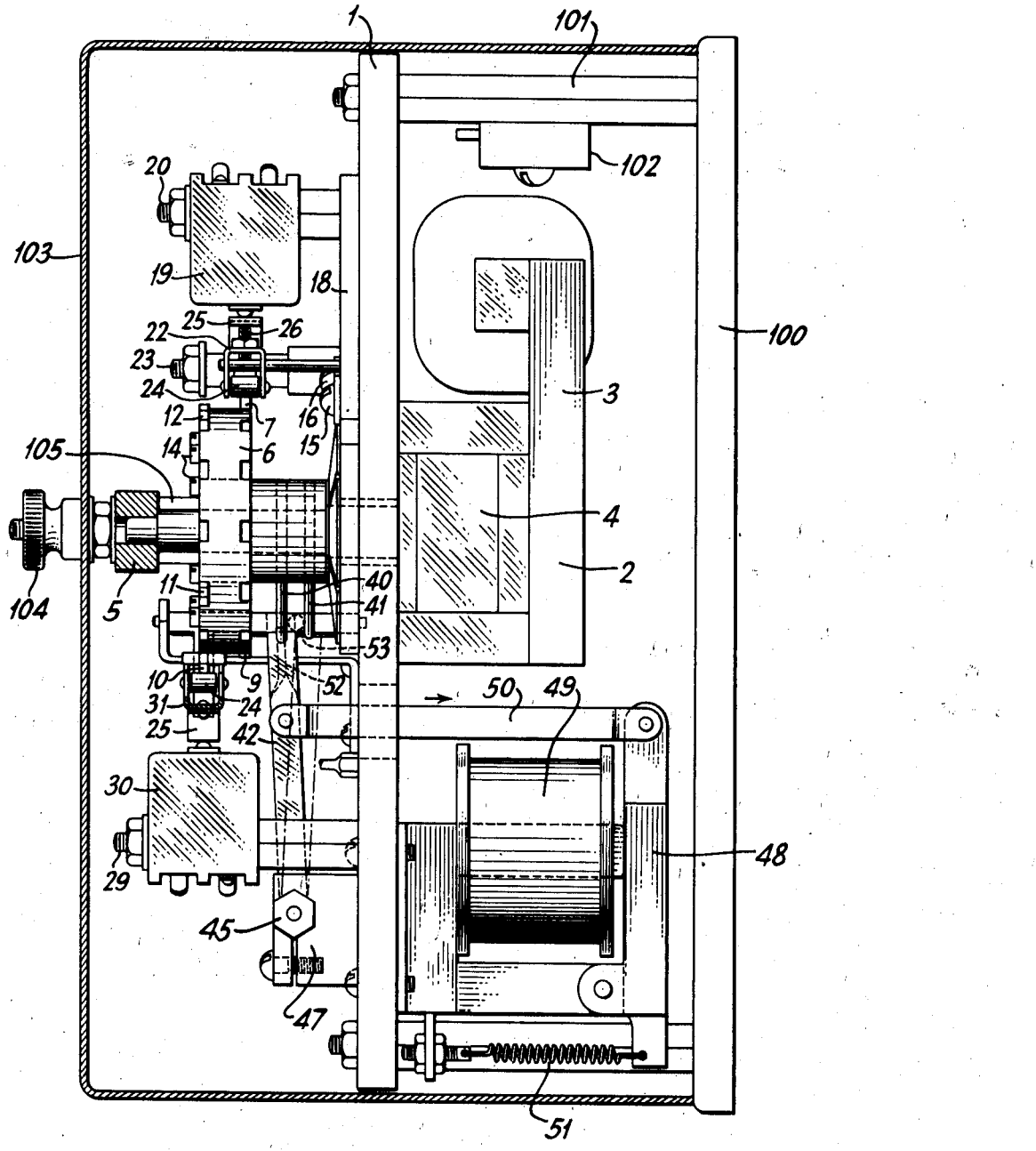

Sept. 2, 1941.　　　C. W. LATIMER　　　2,254,704
AUTOMATIC CIRCUIT RECLOSER
Filed April 15, 1939　　　3 Sheets-Sheet 1

INVENTOR.
CHESTER W. LATIMER
BY
ATTORNEY.

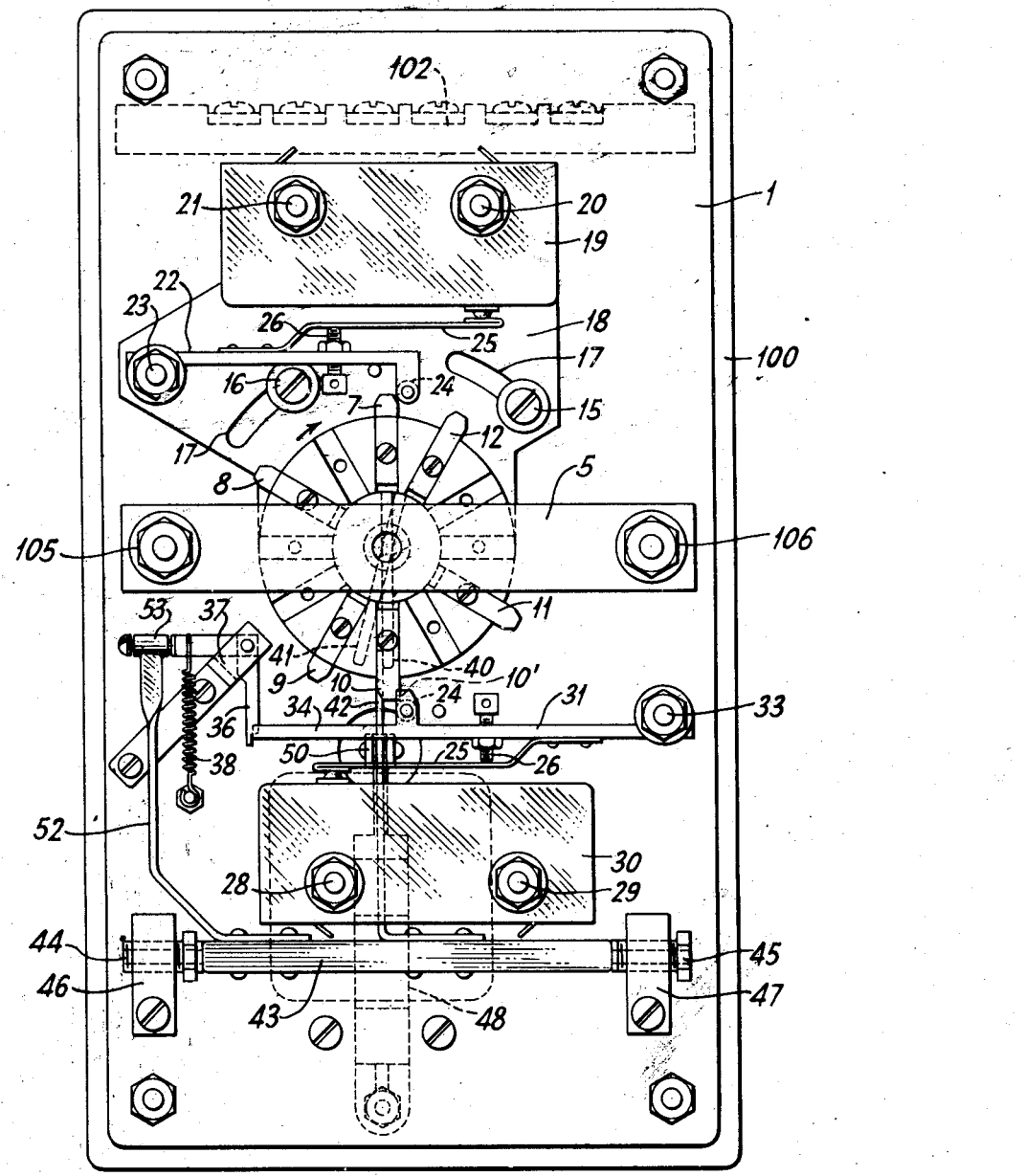

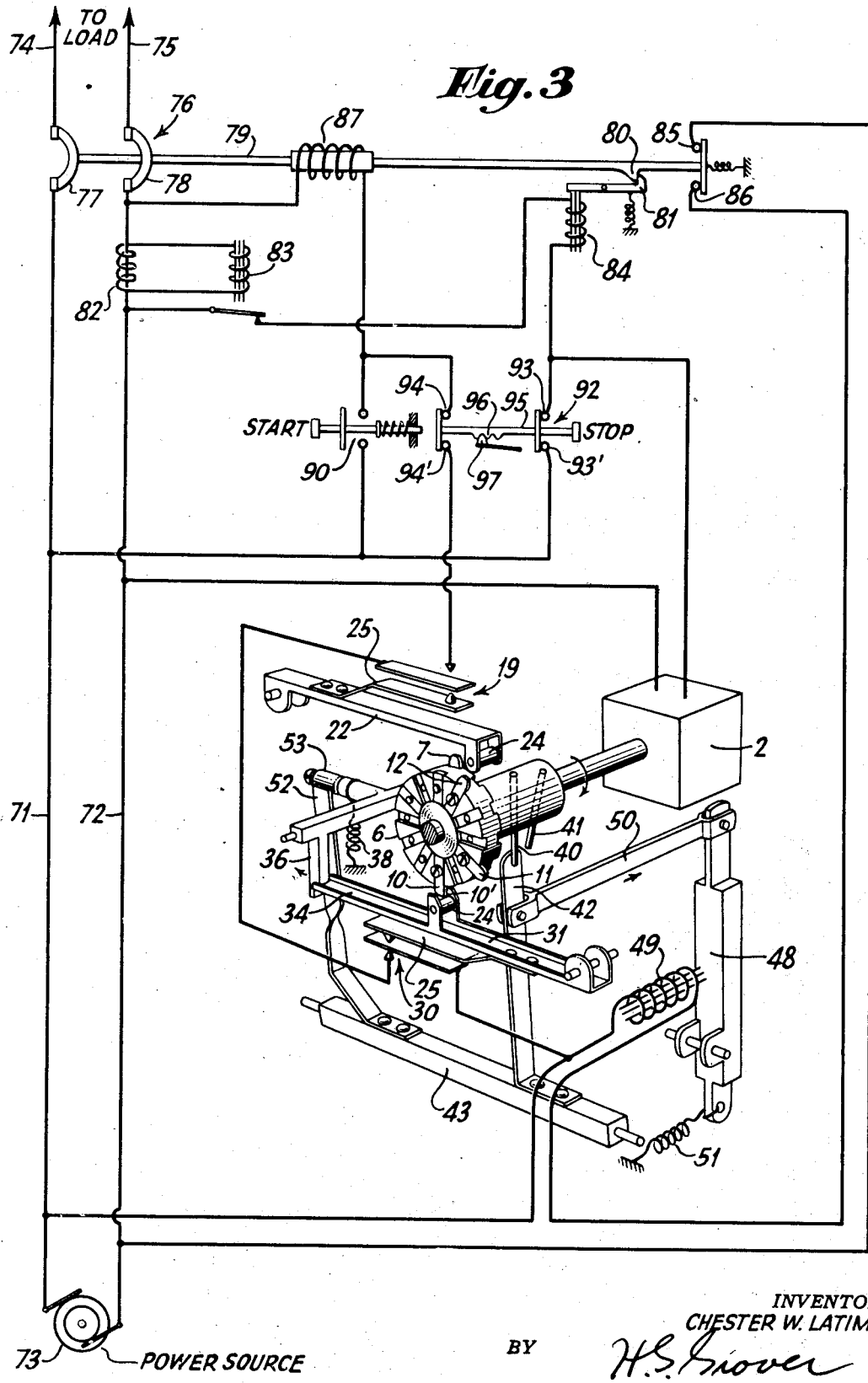

Patented Sept. 2, 1941

2,254,704

UNITED STATES PATENT OFFICE 2,254,704

AUTOMATIC CIRCUIT RECLOSER

Chester W. Latimer, West Orange, N. J., assignor to Radio Corporation of America, a corporation of Delaware Application April 15, 1939, Serial No. 268,073

19 Claims. (Cl. 175—294)

The present invention relates to circuit breaker systems and, particularly, to periodic reclosers therefor.

An object of my invention is to provide a control device for a circuit breaker whereby the circuit breaker may be reclosed a predetermined number of times in response to control impulses in accordance with a predetermined cycle of operation in order to reconnect a load circuit to a power supply after the load circuit has been disconnected from the power supply by reason of some abnormal conditions existing therein.

Another object of my invention is to provide a circuit recloser of the above indicated character containing apparatus that shall lock out a load circuit to preclude a reconnection thereof to the power supply if faulty condition in the load circuit persists after a predetermined interval of time during which the circuit breaker has been reclosed a predetermined number of times.

A further object of my invention is to provide a system of the above indicated character in which the apparatus will reset itself for a subsequent operation if the faulty condition is clear before the faulty predetermined cycle of operations is completed.

A further object of my invention is to provide a system of the above indicated character whereby a circuit breaker will be reclosed only a predetermined number of times at predetermined intervals after the first opening of the circuit breaker and that will preclude further automatic operation of the circuit breaker if the faulty condition is not eliminated.

Still a further object of my invention is to provide a system of the above indicated character whereby the actuating circuit for reclosing the circuit breaker will be energized only once for each of the predetermined intervals above indicated.

A still further object of the invention is to provide a system of the above indicated character that will be simple to construct, cheap to build and which provides automatic reclosing of the circuit breaker promptly after normal circuit conditions are restored thus minimizing loss of service time and attention on the part of an operator.

In practicing my invention, I provide means for opening a circuit breaker to disconnect a load circuit from the power supply upon the occurrence of abnormal conditions in the load circuit. Since it is possible that the faulty condition may be a temporary one, I provide means for automatically effecting the reclosure of the circuit breaker a predetermined number of times at predetermined intervals after the first opening. If the faulty condition clears after any one of the reclosures the circuit breaker remains closed and the recloser device resets itself to its initial position to be ready for operation if another faulty or abnormal condition should again occur. If the faulty condition which causes the opening of the circuit breaker persists after a predetermined number of reclosures the recloser then is rendered effective to lock out the circuit breaker, thus precluding further energization of the load circuit. It is then necessary to reclose the circuit breaker manually which, in practice, would be effected only after the faulty condition has been eliminated. Upon a manual reclosure of the circuit breaker the recloser device of my invention then automatically returns to the normal starting position if such reclosure is successful or proceeds with another cycle of operations if such reclosure is unsuccessful.

The present invention will be more clearly understood by reference to the following detailed description which is accompanied by drawings in which Figure 1 illustrates a side elevation of the recloser device, Figure 2 illustrates a plan view of the recloser device and Figure 3 a circuit diagram showing the circuit breaker and connections of the recloser device to the actuating coils of the circuit breaker.

Referring, now, particularly to Figures 1 and 2, reference numeral 1 indicates a mounting chassis upon which the operating parts are assembled. To the rear of the chassis 1 is mounted a small motor indicated generally by reference numeral 2 and comprising a field structure 3, an armature, not shown, and a reducing gear box 4. The motor may be of the synchronous clock type commonly known as a "Telechron" motor. The gear box 4 reduces the armature speed of the order of 3600 R. P. M. to 1 R. P. M. It is, however, within the scope of my invention to use higher or lower speeds if desired. On the slow speed shaft extending from the gear box is mounted a timing head 6 having on its inner and outer faces slots in which are mounted the inner timing cams 7, 8 and 9 and the outer timing cams 10, 11 and 12 more clearly shown in Figures 2 and 3. The outer end of the slow speed shaft is supported by bracket 5. The timing cams are secured in place in the slots in the faces of the timing head 6 by screws 14. Assuming that the timing head is arranged to make one revolution per minute the structure, as shown, permits the adjustment of cam positions in steps of five seconds. Mounted on a chassis 1 by means of screws 15 and 16 through arcuate slots 17 is a sub-chassis 18. The arcuate slots in the sub-chassis have a common center with the shaft of the timing head 6 and the sub-chassis may, therefore, be rotated about the center of the timing head. The screws 15 and 16 passing through the arcuate slots permit the sub-chassis 18 to be clamped in any desired position within the provided range of movement. A recloser switch 19 of the "Microswitch" type which requires only a very small displacement of the actuating plunger and which can handle several amperes of current reliably because of its snap action, is mounted on sub-chassis 18 by means such as screws 20 and 21. The actuating means for recloser switch 19 comprises an actuating arm 22 pivoted on pivot 23 and carrying at its free end a roller 24 which engages the inner recloser cams 7, 8 and 9. The actuating arm, on the side remote from the timing head, carries a spring arm 25 which engages the actuating plunger of the recloser switch 19. The tension of spring arm 25 may be adjusted by means of adjusting screw 26. Fixedly mounted on chassis 1 by means of screws 28 and 29 is the setup switch 30 which is also of the "Microswitch" type. This switch is operated by an actuating arm 31 pivoted on pivot 33. The arm 31 is of a similar construction to arm 22, except that it is somewhat longer, having an extension 34 extending beyond the cam engaging roller 24. The movement of the actuating arm 31 is conveyed to the plunger of the setup switch by means of spring arm 25 in the same way as explained for the recloser switch 19. Spring arm 25 for the setup switch also has means comprising a screw 26 for adjusting the tension of the arm. The extension 34 on actuating arm 31 engages with a latch 36 which is pivotally supported on the chassis 1 by means of bracket 37. The latch is urged toward the end of extension 34 by means of a spring 38. The end of the latch 36 remote from extension 34 carries a roller 53.

The timing head 6 also carries start pin 40 and a lock-out pin 41 arranged to be selectively engaged by a stop lever 42. The stop lever 42 is mounted on a spindle 43 pivotally supported by bearings 44 and 45. The bearings 44 and 45 are threadedly engaged within supporting blocks 46 and 47 whereby the axial position of the spindle 43 may be adjusted. The purpose of this adjustment will be explained in more detail later in the specification. Also attached to spindle 43 is a latch tripping lever 52. The latch tripping lever 52 at its end engages roller 53 on latch 36 as it swings from one rest position to the other. The stop lever 42 is connected to armature 48 of electromagnet 49 by actuating arm 50. The armature 48 is maintained in a retracted position by spring 51. The recloser switch 19 and set-up switch 30 are electrically connected in series and both must be closed at the same time for actuation of the recloser circuit of the circuit breaker, as will be explained in more detail with reference to Figure 3. For the prevention of more than one closure of the circuit breaker each time the recloser switch 19 is closed, arrangements are necessary whereby closure of the circuit breaker results in an opening of its closing circuit. This is accomplished by location of the operating arm of set-up switch 30 relative to the cams 10, 11 and 12 in the outer ring so that it closes somewhat in advance of the closure of the recloser switch 19, but in no case before the recloser switch 19 has cleared one of its cams 7, 8 or 9. In the absence of suitable arrangement otherwise, the foregoing procedure would simply result in non-concurrent closure of the set-up switch and the recloser switch. The latch 36 is therefore included with the set-up switch actuating mechanism to keep the switch in its actuated position until the recloser switch also closes. At that instant the recloser circuit of the circuit breaker is operated, and upon the closure of the circuit breaker, auxiliary front contacts serving the electromagnet 49 are closed, thus causing the armature 48 of the electromagnet to move from the open to the closed position. This causes the latch tripping lever 52 to sweep past the tripping arm roller 53 of latch 36 and release the actuating arm 31 of the set-up switch 30. The recloser circuit of the circuit breaker is thereby disabled and no further closure of the recloser circuit of the circuit breaker is possible since when the timing head 6 has turned around sufficiently to shift the set-up 30 back to the latched closed position the recloser switch 19 has opened.

Roller 53 carried by the tripping arm of latch 36 is located midway in the path of the end of the latch tripping lever 52. Consequently, movement of the electromagnet armature 48 in either direction, will trip the latch of the set-up switch and allow the latter to open unless at the same time the switch actuating arm is held in place by one of the set-up cams.

In operation, the timing head 6 turns only in a clock-wise direction and comes to rest only in either of two positions, that is, the lock-out position or the starting position, corresponding to engagement of the stop lever 42 respectively with lock-out pin 41 and start pin 40. Under normal operation conditions, it is at rest with the stop lever engaged with the start pin 41. When released from this pin by a trip-out of the circuit breaker, it proceeds to make substantially one complete revolution coming to rest again at the lock-out position if the cycle of reclosures has been unsuccessful, or at the starting position if reclosure has been successful. The clock motor 2 is substantially continuously energized so that it is ready to start the timing head turning instantly upon release of the lever 42 from either the starting or lock-out positions. This, of course, involves stalling of the clock motor 2 while the timing head is at rest, but small clock motors of the type described can be stalled without damage. Of course, if desired, a spring contact might be arranged for interrupting the motor supply while the timing head is held at rest, but this involves unnecessary complications.

Just prior to the arrival of the timing head 6 at the starting position, the corresponding cam 10 in the outer ring closes the set-up switch 30 and leaves it in the latched closed position. Because of the two-way latch tripping feature described heretofore, the first opening of the circuit breaker would trip the set-up switch in the absence of arrangements to the contrary and make it necessary for the timing head to turn sufficiently to carry a cam of the outer ring past the arm 31 of the set-up switch before reclosure could be obtained. Under such conditions, there would be considerable delay between the opening of the circuit breaker and the first reclosure. Accordingly, the cam 10 in the outer ring which immediately precedes the arrival of the timing head 6 at the starting position is fitted with square shoulders 10' so that actuating arm 31 is held in a position which holds switch 30 closed despite operation of the latch as a result of opening of the circuit breaker and maintains it in that position until the timing head has moved slightly from the starting position. Furthermore, these shoulders 10' have such height that the latch 36 reengages arm 34 before the cam 10' and switch arm shoulders disengage. The set-up switch 30 is therefore held closed until the first cam 7 of the inner ring causes closure of the recloser switch 19 and consequent closure of the circuit breaker reclosure circuit. The set-up switch 30 is then tripped as described above by arm 52.

As shown in the drawings, cams 7, 8 and 9 are inner ring cams for operating the recloser switch. Cams 10, 11 and 12 are outer ring cams for operating the set-up switch. Assuming that the timing head is driven at the rate of one revolution per minute, these cam positions correspond to intervals of ten seconds between the first and second operations of the recloser switch, and fifteen seconds between the second and third. Also, as shown in the drawings, only a very slight forward movement of the timing head clock-wise is required to disengage the shoulders of arm 31 of the set-up switch and of the lower cam 10 of the outer ring, thereby making the set-up switch latch mechanism 34, 36 operative. Further forward movement of the timing head 6 brings the top cam 7 into contact with the arm 22 of the recloser switch 19 and causes it to close. This first reclosure occurs about one-half second after the timing head has been released by opening of the circuit breaker. However, with careful adjustment, this first interval may be made much smaller. The spindle 43 carrying the stop lever 42 and the latch tripping lever 52 has adjustable bearings, as mentioned heretofore, whereby it may be adjusted so that the slightest forward movement of the timing head 6 disengages the square shoulders of switch arm 31 from the square shoulders of cam 10 thereby making the set-up switch latch operative. Due to the adjustability of the sub-chassis 18, the position of actuating arm 22 can be so adjusted that when the timing head 6 is in the starting position the first reclosing cam 7 is in contact with the recloser actuating arm 22 but has not raised it sufficiently to operate the recloser switch 19. By means of adjusting screw 26 operating on the leaf spring 25, the positions of the arm of the recloser switch between the unactuated and fully actuated positions, at which closure of the switch occurs, may be very accurately controlled. Obviously, the interval from the time when the circuit breaker opens until the recloser switch is closed can be made not much greater than the small fraction of a second required for the electromagnet armature 48 to move to the open position and the clock motor 2 to come up to speed under load. Of course, adjustments must be avoided which would result in closure of the recloser switch 19 before the shoulders of the set-up switch arm 31 and the cam 10 disengage.

Referring, now, to Figure 3 which shows the circuit diagram of the recloser device and the circuit breaker with which it is associated, reference numerals 71, 72 indicate a power line proceeding from the power source 73 and to which the load circuit is connected at points 74 and 75. Between the load and the power source is connected the circuit breaker indicated generally by the numeral 76. The circuit breaker, as shown, comprises a pair of contact arms 77, 78 which, in the closed position, complete the circuit between the power source 73 and the load. The contact arms are carried by an actuating rod 79 which carries also a latch detent 80. With the circuit breaker in the closed position latch detent 80 is engaged by the latch arm 81 thus holding the circuit closed. In the event of an overload the current passing through current transformer 82 is sufficient to actuate relay 83 thus opening the maintaining circuit for magnet 84 and allowing the latch arm 81 to drop clear of detent 80. As soon as this occurs the contacts 77 and 78 are opened and, likewise, auxiliary front contacts 85, 86 are also opened. In order to reclose the circuit breaker there is provided a recloser coil 87 which is connected through the set-up and recloser switches in my recloser device to a source of power such as line 71, 72. A separate power supply for the recloser device may, of course, be used. Switches 19 and 30 are in this figure shown functionally and are not intended as an illustration of the actual interior construction.

Considering the circuit as shown in which the circuit breaker 76 in a closed position and an overload condition occurring sufficient to trip the circuit breaker, the sequence of operations is as follows:

The timing head 6 is held at rest in the start position by engagement of stop lever 42 with the start pin 40. Opening of the circuit breaker de-energizes the electromagnet 49 due to the opening of the contacts 85, 86. The circuit for this may be traced from conductor 71 of the line through electromagnet 49, thence to contacts 86, 85 and back to conductor 72 of the line. When electromagnet 49 is de-energized the armature 48 is moved to its released position by spring 51 thus disengaging stop lever 42 from the start pin 40 and making it possible for the timing head to start to turn. At the same time latch 36 is operated by the latch tripping lever 52 but immediately returns to the latching position, since the shoulders 10' of cam 10 and the actuating arm 31 of the set-up switch have not had time to disengage. A slight forward movement of the timing head 6 then results in a disengagement of these shoulders and makes the latch 36 responsive to all succeeding movements of the latch tripping lever 52 through the entire timing head cycle. Actuation of the recloser switch 19 by its first cam 7 completes a circuit from conductor 71 through set-up switch 30, recloser switch 19 through contacts 94' and 94 to recloser coil 87 and back to conductor 72. The energization of the coil 87 causes the circuit breaker to close. This also closes contacts 85 and 86 re-energizing electromagnet 49 through the circuit previously explained, drawing the armature 48 to the closed position and causing the latch tripping lever 52 to sweep by roller 53 on latch 36 thus releasing actuating arm 31 of set-up switch 30. In this way, any additional closures of the circuit breaker are prevented until continued movement of the timing head 6 has carried the second cam 11 of the outer ring past the arm 31 of the set-up switch and left it in the latched position. Whether or not the first reclosure of the circuit breaker is successful, the timing head 6 continues on its cycle and if the first or another of the succeeding reclosures provided for by the cams 7, 8 and 9 is successful, the cycle is completed by the return of the timing head to the starting position.

Considering next the case of a sustained overload, under which the circuit breaker 76 will not remain closed, the sequence of operations is the same as above up until the time at which the last reclosure provided for and the immediately subsequent trip-out occur. Electromagnet 49 is then deenergized and its armature 48 is in the open position. This brings the stop lever 42 into the path of the lock-out pin 41 and brings the timing head to rest in the lock-out position. To again close the circuit breaker it is then necessary to close the manually operated circuit breaker by operating "start" switch 90. This completes a circuit from conductor 71 through the start switch 90, recloser coil 87 and back to conductor 72. With the closure of the circuit breaker 76 in this manner, the electromagnet 49 is again energized, at least momentarily, disengaging the stop lever 42 from the lock-out pin and permitting the timing head 6 to again turn to the starting position. If this manually induced reclosure is successful the timing head simply comes to rest at the starting position; but if it is unsuccessful, a whole new cycle of reclosures is initiated, since the circuit breaker must be closed and the electromagnet 49 energized to bring the stop lever 42 into the position where it will bring the timing head to rest at the starting position.

Since the circuit breaker 76 is maintained in its actuating position only by continuous energization of magnet 84, the circuit breaker opens when the power supply is interrupted and the effect of a power failure on the functioning of the reclosure is essentially the same as that of a momentary overload which trips the circuit breaker. Both the resultant opening of the circuit breaker and the power failure itself deenergize electromagnet 49, disengaging the stop arm 42 from the start pin 40. The set-up switch latch 36 is also tripped but immediately regains control. Return of the power supply finds the circuit for electromagnet 49 open, but the clock motor 2 circuit closed so the timing head 6 proceeds with its cycle as usual.

In case of a power failure after the timing head has started on its cycle, the cycle is simply continued to completion when the power supply is restored.

It is also possible, of course, for the circuit breaker to open or the power supply to fail at a point in the timing head cycle where the set-up switch 30 has been closed and latched, but before the recloser switch 19 has been operated. When this happens the set-up switch 30 is, of course, released by the movement of arm 52 making the immediately following closure of the recloser switch 19 ineffective. The only effect in such a case is a temporary apparent reduction, by one, of the number of reclosing cams 7, 8 and 9.

In Figure 3 I have also shown a manually operated "stop" switch 92 having a pair of sets of contacts 93, 93' and 94, 94'. The contact arms for these sets of contacts are rigidly connected together by an insulating arm 95 carrying detents 96 engaging a spring 97. As a consequence of the operation of the detents and the spring 97, the stop switch is maintained in either its open or closed position. The "start" switch 90 is so arranged with respect to the "stop" switch that an actuation of the starting switch moves the stop switch to the position shown in the drawing. As a consequence of this arrangement, operation of the "stop" button opens switch 94, 94' connected in series with the automatic recloser switches, and operation of the start button is necessary to reclose this switch. In the absence of such an arrangement, the automatic recloser would have control from the instant power reaches the line side of the circuit breaker and possibly cause premature closure. The power supply to the clock motor is interrupted when the automatic recloser is thus rendered inoperative to prevent unnecessary cycling of the timing head.

While I have shown my improved recloser device as applied to one particular type of circuit breaker in Figure 3, it is to be distinctly understood that it may be used with any electrically operated circuit breaker having a recloser coil which requires only a momentary energization for its operation, or which can be operated by interposing a self-locking relay, which requires only momentary energization for its operation, between the circuit breaker and my device.

Referring again to Figure 1, chassis 1 is shown as being supported from a mounting base 100 by posts 101. For convenience in connecting the recloser to its associated circuits a terminal board 102 may be provided. The wiring to the terminal board has not been shown in Figures 1 and 2 in order to avoid confusion but the connection may be readily understood by reference to the schematic diagram in Figure 3. In order to protect the mechanism of the recloser from mechanical damage, dust and so forth, a cover 103 may be used. The cover is clamped in place by thumb nuts 104 screwed on posts 105, 106.

While I have particularly shown and described an embodiment of my invention, it is to be clearly understood that my invention is not limited thereto but modifications may be made within the scope of the invention.

I claim:

1. In combination, a circuit breaker, means for tripping said circuit breaker under predetermined conditions and means for automatically reclosing said breaker, said second means comprising a reclosing coil and a pair of switches serially connected to a source of power, a latch and means responsive to an open condition of said circuit breaker for sequentially and non-concurrently momentarily closing said switches a predetermined number of times at predetermined intervals constituting a cycle of operations, said latch maintaining the first closed switch of said pair in a closed position and means responsive to a reclosure of said circuit breaker for disabling said latch.

2. In combination, a circuit breaker, means for tripping said circuit breaker under predetermined conditions and means for automatically reclosing said breaker, said second means comprising a reclosing coil and a pair of switches serially connected to a source of power, a latch and means responsive to an open condition of said circuit breaker for sequentially and non-concurrently momentarily closing said switches a predetermined number of times at predetermined intervals constituting a cycle of operations, said latch maintaining the first closed switch of said pair in a closed position and means responsive to a reclosure of said circuit breaker for disabling said latch, said last mentioned means also disabling said switch closing means at the end of said cycle of operations.

3. A recloser device for a circuit breaker having means for opening said circuit breaker under predetermined conditions and means for automatically reclosing said breaker including a reclosing coil and a source of power, a pair of switches serially connected between said coil and said source of power, a latch and means responsive to an open condition of said circuit breaker for sequentially and non-concurrently momentarily closing said switches a predetermined number of times at predetermined intervals constituting a cycle of operations, said latch maintaining the first closed switch of said pair in a closed position and means responsive to a reclosure of said circuit breaker for disabling said latch.

4. A recloser device for a circuit breaker having means for opening said circuit breaker under predetermined conditions and means for automatically reclosing said breaker including a reclosing coil and a source of power, a pair of switches serially connected between said coil and said source of power, a latch and means responsive to an open condition of said circuit breaker for sequentially and non-concurrently momentarily closing said switches a predetermined number of times at predetermined intervals constituting a cycle of operations, said latch maintaining the first closed switch of said pair in a closed position and means responsive to a reclosure of said circuit breaker for disabling said latch, said last mentioned means also disabling said switch closing means at the end of said cycle of operations.

5. A recloser device for a circuit breaker having means for opening said circuit breaker under predetermined conditions and means for automatically reclosing said breaker including a reclosing coil and a source of power, a pair of switches serially connected between said coil and said source of power, a pair of cams for sequentially and non-concurrently closing momentarily said switches a predetermined number of times at predetermined intervals constituting a cycle of operations, a stop lever for holding said cams stationary, means responsive to an open condition of said circuit breaker for disengaging said stop lever whereby said cams operate said switches through one cycle of operations, a latch for maintaining one of said switches in a closed position and means responsive to a movement of said stop lever for releasing said latch whereby after closure of said circuit breaker said reclosing means is disabled.

6. A recloser device for a circuit breaker having means for opening said circuit breaker under predetermined conditions and means for automatically reclosing said breaker including a reclosing coil and a source of power, a pair of switches serially connected between said coil and said source of power, motor driven means for sequentially and non-concurrently momentarily closing said switches a predetermined number of times at predetermined intervals constituting a cycle of operations, a stop lever for holding said switch closing means stationary, means responsive to an open condition of said circuit breaker for disengaging said stop lever whereby said switch closing means operates said switches through one cycle of operations, a latch for maintaining one of said switches in a closed position, and means responsive to a closure of said circuit breaker for releasing said latch whereby after closure of said circuit breaker said reclosing means is disabled.

7. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and nonconcurrently closing said switches a predetermined number of times at predetermined intervals constituting a cycle of operations, a stop lever for holding said cams stationary, means responsive to an open condition of said circuit breaker for disengaging said stop lever whereby said cams operate said switches through one cycle of operations, a latch for maintaining one of said switches in a closed position and means responsive to a closure of said circuit breaker for releasing said latch whereby after closure of said circuit breaker said reclosing means is disabled.

8. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and nonconcurrently closing said switches a predetermined number of times at predetermined intervals constituting a cycle of operations, a start pin and a lock-out pin attached to said cams, a stop lever normally in engagement with said start pin whereby said cams are held stationary, actuating means for said stop lever responsive to an open condition of said circuit breaker for disengaging said stop lever from said start pin whereby said cycle of switch operations is initiated, a latch for maintaining one of said switches in a closed position, said latch being operative at the initiation of said cycle and thereafter during said cycle as long as said circuit breaker is open, means for tripping said latch responsive to a motion of said stop lever whereby closure of said circuit breaker releases said latch, said stop lever engaging said lock-out pin at the end of said cycle of operations in response to open conditions of circuit breaker after a predetermined number of closures.

9. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and non-concurrently closing momentarily said switches a number of times in a predetermined cycle of operations, a start pin and a lockout pin attached to said cams, a stop lever normally in engagement with said start pin whereby said cams are held stationary, actuating means for said stop lever responsive to an open condition of said circuit breaker for disengaging said stop lever from said start pin whereby said cycle of switch operations is initiated, a latch for maintaining one of said switches in a closed position, said latch being operative at the initiation of said cycle and thereafter during said cycle as long as said circuit breaker is open and means connected to said lever for tripping said latch whereby closure of said circuit breaker releases said latch so that subsequent closures of said switches are ineffective.

10. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and non-concurrently closing momentarily said switches a number of times in a predetermined cycle of operations, a start pin and a lock-out pin attached to said cams, a stop lever selectively engageable with said start pin or said lock-out pin at the end of said cycle whereby said cams are held stationary, said stop lever being normally in engagement with said start pin, actuating means for said stop lever responsive to an open condition of said circuit breaker for disengaging said stop lever from said start pin whereby said cycle of switch operations is initiated, a latch for maintaining one of said switches in a closed position, said latch being operative at the initiation of said cycle and means for tripping said latch connected to said stop lever whereby the closure of said circuit breaker releases said latch so that subsequent closures of said switches are ineffective, said actuating means operating said stop lever into engagement with said lock-out pin in response to an open condition of said circuit breaker at the end of said cycle of operations.

11. In combination, a circuit breaker, means for tripping said circuit breaker under predetermined conditions and means for automatically reclosing said breaker, said second means comprising a reclosing coil and a pair of switches serially connected to a source of power, a pair of motor driven cams for sequentially and non-concurrently closing momentarily said switches a number of times in a predetermined cycle of operations, a start pin and a lock-out pin attached to said cams, a stop lever selectively engageable with said start pin or said lock-out pin at the end of said cycle whereby said cams are held stationary, said stop lever being normally in engagement with said start pin, actuating means for said stop lever responsive to an open condition of said circuit breaker for disengaging said stop lever from said start pin whereby said cycle of switch operations is initiated, a latch for maintaining one of said switches in a closed position, said latch being operative at the initiation of said cycle and thereafter during said cycle as long as said circuit breaker is open and means for tripping said latch connected to said stop lever whereby the closure of said circuit breaker releases said latch so that subsequent closures of said switches are ineffective, said actuating means operating said stop lever into engagement with said lock-out pin in response to an open condition of said circuit breaker at the end of said cycle of operations.

12. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and non-concurrently closing momentarily said switches a number of times in a predetermined cycle of operations, a start pin and a lock-out attached to said cams, a stop lever and means for moving said stop lever into the path of said start pin in response to a closed position of said circuit breaker and into the path of said lock-out pin in response to an open condition of said circuit breaker whereby said cams are held stationary at the end of said cycle of operations, said lock-out pin being advanced with respect to said stop lever whereby actuation of said stop lever from the path of said start pin initiates one cycle of operation of said switches, a latch for maintaining one of said switches in a closed position, said latch being operative at the initiation of said cycle and means for tripping said latch in response to a movement of said stop lever whereby operation of said switches subsequent to closure of said circuit breaker is ineffective.

13. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and nonconcurrently closing momentarily said switches a number of times in a predetermined cycle of operations, a start pin and a lockout pin attached to said cams, a stop lever and means for moving said stop lever into the path of said start pin in response to a closed position of said circuit breaker and into the path of said lock-out pin in response to an open condition of said circuit breaker whereby said cams are held stationary at the end of said cycle of operations, said lock-out pin being advanced with respect to said stop lever whereby actuation of said stop lever from the path of said start pin initiates one cycle of operation of said switches, a latch for maintaining one of said switches in a closed position, means for tripping said latch in response to a movement of said stop lever and means for preventing the initial movement of said stop lever from releasing said latch.

14. In combination, a circuit breaker, means for tripping said circuit breaker under predetermined conditions and means for automatically reclosing said breaker, said second means comprising a reclosing coil and a pair of switches serially connected to a source of power, a pair of motor driven cams for sequentially and non-concurrently closing momentarily said switches a number of times in a predetermined cycle of operations, a start pin and a lock-pin attached to said cams, a stop lever and means for moving said stop lever into the path of said start pin in response to a closed position of said circuit breaker and into the path of said lock-out pin in response to an open condition of said circuit breaker whereby said cams are held stationary at the end of said cycle of operations, said lock-out pin being advanced with respect to said stop lever whereby actuation of said stop lever from the path of said start pin initiates one cycle of operation of said switches, a latch for maintaining one of said switches in a closed position, means for tripping said latch in response to a movement of said stop lever and means for preventing the initial movement of said stop lever from releasing said latch.

15. A recloser device for a circuit breaker having means for opening said circuit breaker under predetermined conditions and means for automatically reclosing said breaker including a reclosing coil and a source of power, a pair of switches serially connected between said coil and said source of power, a pair of motor driven cams for sequentially and non-concurrently closing momentarily said switches a number of times in a predetermined cycle of operations, a start pin and a lock-out pin attached to said cams, a stop lever selectively engageable with said start pin or said lock-out pin at the end of said cycle whereby said cams are held stationary, said stop lever being normally in engagement with said start pin, an actuating magnet for holding said stop lever in the path of said start pin and means responsive to an open condition of said circuit breaker for de-energizing said magnet whereby said stop lever is released from said start pin and said cycle of switch operations is initiated, a latch for maintaining one of said switches in a closed position, and means for tripping said latch through movement of said stop lever whereby the closure of said circuit breaker releases said latch, and means for preventing the initial movement of said stop lever from releasing said latch.

16. A recloser device comprising a first and a second switch serially connected and adapted to close a reclosure circuit for a circuit breaker, a motor driven cam wheel having an inner series of cam levers each momentarily closing said first switch and an outer series of cam levers each momentarily closing said second switch, a start pin and a lock-out pin also carried by said cam wheel, a stop lever, means for moving said stop lever into engagement with said start pin in response to closure of said circuit breaker, means for moving said stop lever into the path of said lock-out pin in response to an opening of said circuit breaker, a latch for maintaining said second switch in its closed position, means for releasing said latch in response to the movement of said stop lever, the first cam lever of said outer series being so formed and so located with respect to said second switch that it maintains said second switch closed when said start pin is in engagement with said stop lever whereby said latch releasing means is ineffective during the first movement of said stop lever, corresponding to the opening of previously closed said circuit breaker.

17. A recloser device comprising a first and a second switch serially connected and adapted to close a reclosure circuit for a circuit breaker, a motor driven cam wheel having an inner series of cam levers each momentarily closing said first switch and an outer series of cam levers each momentarily closing said second switch in advance of momentary closing of said first switch, a start pin and a lock-out pin also carried by said cam wheel, a stop lever selectively engageable with said start pin or said lock-out pin whereby said cams are held stationary at the end of a cycle of closures of said switches, means for moving said stop lever into the path of said start pin in response to closure of said circuit breaker, means for moving said stop lever into the path of said lock-out pin in response to opening of said circuit breaker, a latch for maintaining said second switch in its closed position, means whereby movement of said stop lever in response to opening or closure of said circuit breaker releases said latch, the first cam lever of said outer series being so formed and so located with respect to said second switch that it maintains said second switch closed when said start pin is in engagement with said stop lever whereby said latch releasing means is ineffective during the first movement of said stop lever corresponding to opening of previously closed said cricuit breaker, and means for shifting said first switch around the axis of said cam wheel with respect to said inner series of cam levers whereby its closure time may be adjusted with respect to closure time of said second switch.

18. A switching device comprising a first and a second switch serially connected, a motor driven cam wheel having an inner series of cam levers each momentarily closing said first switch and an outer series of cam levers each momentarily closing said second switch in advance of momentary closing of said first switch, a start pin and a lock-out pin also carried by said cam wheel, a stop lever selectively engageable with said start pin or said lock-out pin whereby said cams are held stationary at the end of a cycle of closures of said switches, means for moving said stop lever into the path of said start pin, means for moving said stop lever into the path of said lock-out pin, a latch for maintaining said second switch in its closed position, means for releasing said latch in response to the movement of said stop lever, the first cam lever of said outer series being so located with respect to said second switch that it maintains said second switch closed when said start pin is in engagement with said stop lever whereby said latch releasing means is ineffective during the first movement of said stop lever and means for shifting said first switch around the axis of said cam wheel with respect to said inner series of cam levers whereby its closure time may be adjusted with respect to closure time of said second switch.

19. An automatic recloser device comprising a first and a second switch serially connected and adapted to close a closing circuit for a circuit breaker, a motor driven cam wheel having a first series of cams for momentarily closing said first switch in advance of momentary closure of said second switch, a second series of cams for momentarily closing said second switch, means for shifting said second switch around the axis of said cam wheel with respect to said second series of cams whereby its closure time may be adjusted with respect to closure time of said first switch but not concurrently therewith, a start pin and a lock-out pin carried by said cam wheel, a stop lever, means for moving said stop lever selectively into the path of said start pin in response to closure of said circuit breaker and into the path of said lock-out pin in response to opening of said circuit breaker, whereby movement of said lever in response to opening of said circuit breaker disengages it from said start pin allowing said motor driven cam wheel to proceed on a cycle of operation in which said series of second cams successively momentarily closes said second switch a predetermined number of times at predetermined intervals and in which said first series of cams successively momentarily closes said first switch a corresponding number of times at corresponding intervals but prior to and non-concurrently with closures of said second switch, a latch for maintaining said first switch in its closed position after each said closure of said first switch in advance of and non-concurrently with each said closure of said second switch enabling closure of said second switch to complete said closing circuit for said circuit breaker, latch releasing means actuated by movement of said stop lever in response to closure or opening, other than the first opening of said circuit breaker for allowing said first switch to open thereby opening said closing circuit of said circuit breaker and preventing further actuation thereof until said first switch is again closed and latched and said second switch is thereafter again closed, the formation and location of the first cam of said first series with respect to said first switch being such that it maintains said first switch closed when said start pin is in engagement with said stop lever, whereby said latch releasing means is ineffective during the first movement of said stop lever in response to the first opening of said circuit breaker previously closed, said stop lever moving means being so arranged that said motor driven cam completes its cycle of operation with said stop lever re-engaged with said start pin in readiness for another cycle of operation if said circuit breaker remains closed after the last of said sequential closings of said first and second switches in said completed cycle, and with said stop lever engaged with said lock-out pin if said circuit breaker opens after the last of said sequential closings of said first and second switches in said completed cycle said motor driven cam being thereby disabled, means for manually closing said circuit breaker closing circuit, said stop lever being disengaged from said lock-out pin in response to said manual closing whereby said motor driven cam is rotated to its starting position with said start pin in engagement with said stop lever.

CHESTER W. LATIMER.